(12) United States Patent
Prasad et al.

(10) Patent No.: US 9,531,599 B2
(45) Date of Patent: Dec. 27, 2016

(54) VIRTUAL OPTICAL NETWORK PROVISIONING BASED ON MAPPING CHOICES AND PATTERNS

(71) Applicant: Fujitsu Limited, Kawasaki-shi, Kanagawa (JP)

(72) Inventors: Mukul R. Prasad, San Jose, CA (US); Indradeep Ghosh, Cupertino, CA (US); Xi Wang, Murphy, TX (US); Paparao Palacharla, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 281 days.

(21) Appl. No.: 14/491,702

(22) Filed: Sep. 19, 2014

(65) Prior Publication Data
US 2016/0087846 A1 Mar. 24, 2016

(51) Int. Cl.
| | | |
|---|---|---|
| *H04L 12/24* | (2006.01) | |
| *H04L 12/713* | (2013.01) | |
| *H04Q 11/00* | (2006.01) | |
| *H04L 12/721* | (2013.01) | |

(52) U.S. Cl.
CPC ........... *H04L 41/12* (2013.01); *H04L 41/0806* (2013.01); *H04Q 11/0066* (2013.01); *H04L 45/62* (2013.01); *H04Q 2011/009* (2013.01); *H04Q 2011/0086* (2013.01)

(58) Field of Classification Search
CPC ...... H04L 41/0806; H04L 41/12; H04L 45/62; H04Q 11/0066; H04Q 2011/0086; H04Q 2011/009
See application file for complete search history.

(56) References Cited

U.S. PATENT DOCUMENTS

| | | | | |
|---|---|---|---|---|
| 2014/0068045 A1* | 3/2014 | Tarui | ....................... | H04L 41/02 709/223 |
| 2015/0036541 A1* | 2/2015 | Xu | ....................... | H04L 41/0226 370/254 |
| 2015/0043911 A1* | 2/2015 | Patel | .................. | H04J 14/0257 398/48 |
| 2015/0104166 A1* | 4/2015 | Patel | .................. | H04Q 11/0066 398/5 |
| 2015/0104172 A1* | 4/2015 | Wang | .................. | H04J 14/0254 398/58 |

OTHER PUBLICATIONS

Fischer et al., "Virtual Network Embedding: A Survey", IEEE Communications Surveys and Tutorials, 15(4):1888-1906, Feb. 2013.

(Continued)

*Primary Examiner* — Shi K Li
*Assistant Examiner* — Mina Shalaby
(74) *Attorney, Agent, or Firm* — Baker Botts L.L.P.

(57) ABSTRACT

Virtual optical network (VON) provisioning using implicit encoding of mapping constraints may include evaluating mapping choices to exclude certain mapping patterns before evaluating the mapping patterns. For each virtual node in a VON request, candidate physical nodes may be assigned and evaluated for compliance with constraints associated with the VON request. The constraints may be expanded to allow for various selection criteria for the VON request. Multiple VON requests may be simultaneously evaluated to find optimal solutions for the physical network.

21 Claims, 9 Drawing Sheets

(56) References Cited

OTHER PUBLICATIONS

Wang et al., "Flexible Virtual Network Provisioning over Distance-Adaptive Flex-Grid Optical Networks", OFC 2014, Journal of Optical Communications and Networking, 7:A318-A325, Dec. 18, 2014.
Pages et al., "Optimal allocation of virtual optical networks for future internet", ONDM 2012, 6 pages, Apr. 2012.
Xie et al., "Survivable Virtual Optical Network Mapping in Flexible-Grid Optical Networks", ICNC 2014, pp. 221-225, Feb. 2014.

* cited by examiner

VIRTUAL OPTICAL NETWORK PROVISIONING BASED ON MAPPING CHOICES AND PATTERNS

BACKGROUND

Field of the Disclosure

The present disclosure relates generally to optical communication networks and, more particularly, to flexible virtual optical network provisioning based on mapping choices and patterns, such as using implicit encoding of mapping constraints.

Description of the Related Art

Telecommunication, cable television and data communication systems use optical networks to rapidly convey large amounts of information between remote points. In an optical network, information is conveyed in the form of optical signals through optical fibers, also referred to as a lightpath.

Software-defined networking (SDN) represents an important step towards network virtualization and/or abstraction and may allow for a logical network entity to be instantiated automatically using software instructions, rather than manually from user input. In this manner, SDN may enable flexible definition of virtual networks. For example, using the OpenFlow communications protocol managed by The Open Network Foundation (ONF), a traffic flow entity may be instantiated using an arbitrary combination of layer identifiers defined in a header space. OpenFlow may use various combinations of traffic identifiers (Internet-protocol (IP) addresses, media access controller (MAC) addresses, port addresses, etc.) at various layers to define a traffic flow. Then, by installing and configuring packet-forwarding rules associated with the flow to physical switches, an OpenFlow controller may ensure that the traffic flow entity instantiates a path that is routed through a network including the physical switches.

OpenFlow's FlowVisor may instantiate a virtual network entity (called a "slice") by associating multiple traffic flow entities with a given slice, whereby each slice is managed by a separate tenant controller, allowing the tenant to control over a portion of network traffic and a subset of the physical network. In OpenFlow, multiple flowspaces may be defined for each network switch. Each flowspace may be associated with a slice, which in turn is managed by a separate controller. FlowVisor may ensure that actions in one slice do not affect another by intercepting and rewriting OpenFlow messages.

The principles and features of SDN technologies were initially deployed with a focus on internet protocol (IP) and Ethernet networks. However, the concept of SDN may be introduced to optical networks as well. For example, the SDN concept may be applied to agile optical networks built using colorless/directionless/flex-grid reconfigurable optical add-drop multiplexers (ROADMs) and programmable transponders for multiple modulation formats. An SDN-enabled optical network may be referred to as a Software-Defined Optical Network (SDON), which may be more open, programmable, and application aware. A feature of SDON is optical network virtualization, which may enable network service providers to provision multiple coexisting and isolated virtual optical networks (VONs) over the same physical infrastructure. For example, in conventional optical networks, network services are provided in terms of lightpaths (i.e., optical network paths between given endpoints). In SDONs, network services may be provided in terms of VONs. When provisioning VONs in response to a request, different mapping patterns for mapping a virtual node to physical topology may be possible.

SUMMARY

In one aspect, a disclosed method for network provisioning may include receiving a first virtual optical network (VON) request specifying constraints on a physical optical network. Responsive to receiving a first virtual optical network (VON) request specifying constraints on a physical optical network, the method may include applying a search to search a space of virtual node to physical node partial mapping patterns to identify valid mapping patterns that satisfy the first VON request. The search may include method operations for each of the virtual nodes specified in the first VON request, including a first virtual node. Based on previously accumulated valid mapping choices, the search may include evaluating candidate physical nodes for the first virtual node, including a first candidate physical node, for incorporation into the valid mapping patterns. When a mapping choice of the first candidate physical node for the first virtual node enables a valid mapping pattern, the evaluating may comprise including the first candidate physical node as a valid mapping choice for the first virtual node. When a mapping choice of the first candidate physical node for the first virtual node does not enable a valid mapping pattern, the evaluating may comprise eliminating the first candidate physical node as a valid mapping choice for the first virtual node. The search may further include accumulating the valid mapping choices from each of the candidate physical nodes for the first virtual node and accumulating the valid mapping choices, respectively, for each of the virtual nodes. The search may also include evaluating the valid mapping choices to identify the valid mapping patterns.

Additional disclosed aspects for network provisioning include a system for network provisioning and a non-transitory computer readable memory device or medium storing processor-executable instructions, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
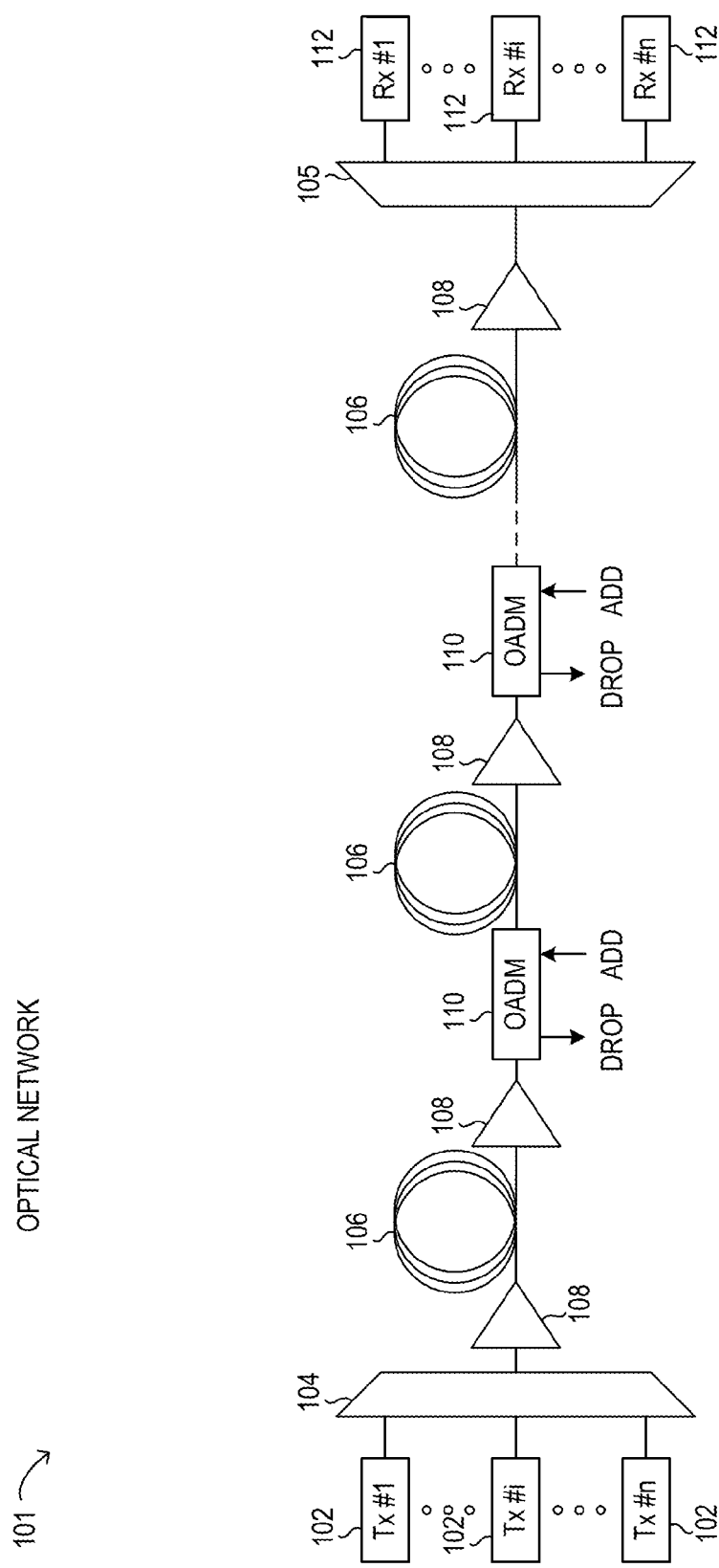
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As noted previously, in a Software-Defined Optical Network (SDON), network services may be provided as virtual optical networks (VONs), instead of lightpaths. VON provisioning may be distinguishable from conventional lightpath provisioning in certain aspects. For example, a lightpath may be a point-to-point connection, while a VON may include a network including multiple virtual nodes and virtual links. Each virtual node in a VON may be mapped to a physical optical node, while each virtual link in a VON may be mapped to a lightpath connecting the corresponding physical optical nodes. In certain embodiments, the lightpaths for a particular VON may be provisioned collectively, rather than individually. In this manner, a VON request may be served when all virtual links have been successfully mapped to lightpaths under the desired criteria for the VON request.

Furthermore, a particular lightpath may have a fixed source and destination node. In a VON, the virtual node to physical node mapping may be flexible. For example, a virtual node may be mapped to any physical node within a certain geographic area or among a certain number of specified physical nodes, as long as a resulting physical SDON slice satisfies the service-level agreement of the VON. Such flexibility may empower a network service provider to optimize resource usage and reduce service provisioning costs.

VON provisioning may generalize the concept of optical networking service from point-to-point fixed-node-pair lightpath provisioning to multi-point flexible-nodes, or group optical network slicing. Because a lightpath may be a particular instance of a VON including two virtual nodes, each with a fixed node mapping, an SDON service provider may have backward-compatibility to lightpath provisioning with little to no modification of its VON service provisioning system.

Furthermore, VON provisioning may be subject to unique constraints arising from the underlying physical optical network infrastructure. One constraint from a VON request may be a spectral slot constraint, where a continuous lightpath at a given wavelength, referred to as a 'spectral slot', is desired by a network customer for a VON request. Because the number of spectral slots within the physical optical network may be limited, optimal VON provisioning may involve consideration of spectral slot availability between physical nodes when performing a mapping. Another VON constraint may involve distance adaptive modulation, where different length lightpaths may be considered within a given VON request. Because a length of a lightpath impacts the cost of the mapping, distance adaptive modulation may be a determining factor between different mapping patterns for a VON request. Additional constraints for VON requests, such as physical layer impairments, where adjacent spectral slots may not be used for certain lightpaths, may also be associated with VON provisioning.

In addition, VON provisioning may be associated with general provisioning constraints. A VON request may be limited to assignment of a physical node to at most one virtual node specified in the VON request. Each virtual link between two virtual nodes in the VON request may be subject to a virtual link capacity constraint for the physical infrastructure. Also, a VON request may specify certain candidate physical nodes, which may constrain mapping choices.

For many actual physical optical networks, multiple VON requests may be serviced at any given time. Because actual implementations of physical optical networks may include large numbers of physical nodes and lightpaths, determining optimal VON mappings to the physical optical network may involve significant computational resources and correspondingly long computation times, which are undesirable for a network service provider. Furthermore, conventional methods that iterate physical network-to-VON request mappings may be associated with certain disadvantages when searching for an optimal mapping when multiple VON requests are received for the same physical network infrastructure.

For example, heuristic mappings are known that process each VON request upon receipt and assign a best-fit mapping pattern according to a desired criteria, such as minimization of a cost function for the network operator that fulfills the VON request. Even though such heuristic mapping techniques may be relatively efficient computationally, heuristic mapping solutions may not provide an optimal VON mapping because existing VON requests in service are not easily considered when a new VON request is received. Thus, in heuristic mapping certain permutations of multiple VON requests may remain unselected, while a given number of VON requests that may be serviceable using such permutations may be denied. As a result, an overall capacity utilization of the physical optical network may remain below a desirable level when heuristic mapping is used.

In another example, exhaustive enumeration may be performed over the space of all possible mapping choices when a new VON request is received, and may include re-mapping of existing VON requests. Such an approach would theoretically find the optimal mapping solution whenever a new VON request is received. However, the computational resources and computation time for exhaustive enumeration may be prohibitively expensive and may be insufficiently flexible to respond in an economically practical manner, particularly for larger optical networks.

As will be described in further detail, the methods and systems described herein for VON provisioning using implicit encoding of mapping constraints may provide an optimal solution for servicing multiple VON requests, while providing a computationally tractable search for an optimal mapping pattern. In particular embodiments, a search using a branch and bound methodology (or other similar methodology) may be utilized to search the solution space for a VON request using implicit encoding of mapping constraints that enables evaluation of different virtual node mappings before complete mapping patterns have been generated. In addition to the physical-to-virtual node constraints, various other constraints may be efficiently accommodated.

Turning now to the drawings, FIG. 1 illustrates an example embodiment of optical network 101, which may represent an optical communication system. Optical network 101 may include one or more optical fibers 106 configured to transport one or more optical signals communicated by components of optical network 101. The network elements of optical network 101, coupled together by optical fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical network 101 may include devices configured to transmit optical signals over optical fibers 106. Information may be transmitted and received through optical network 101 by modulation of one or more wavelengths of light to encode the information on the wavelength. In optical networking, a wavelength of light may also be referred to as a channel. Each channel may be configured to carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may be configured to transmit disparate channels using WDM or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before and/or after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device configured to add and/or drop optical signals (i.e., at individual wavelengths) from fibers 106. After passing through an OADM 110, an optical signal may travel along fibers 106 directly to a destination, or the signal may be passed through one or more additional OADMs 110 and/or optical amplifiers 108 before reaching a destination.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

In FIG. 1, optical network 101 may also include receivers 112 coupled to demultiplexer 105. Each receiver 112 may be configured to receive optical signals transmitted at a particular wavelength or channel, and may process the optical signals to obtain (e.g., demodulate) the data that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to optical network 101 without departing from the scope of the disclosure. For example, optical network 101 may include more or fewer elements than those depicted in FIG. 1. Additionally network 101 may include additional elements not expressly shown, such as a dispersion compensation module (DCM). Also, as mentioned above, although depicted as a point-to-point network, optical network 101 may comprise any suitable network topology for transmitting optical signals such as a ring, a mesh, and/or a hierarchical network topology.

Figure 2:
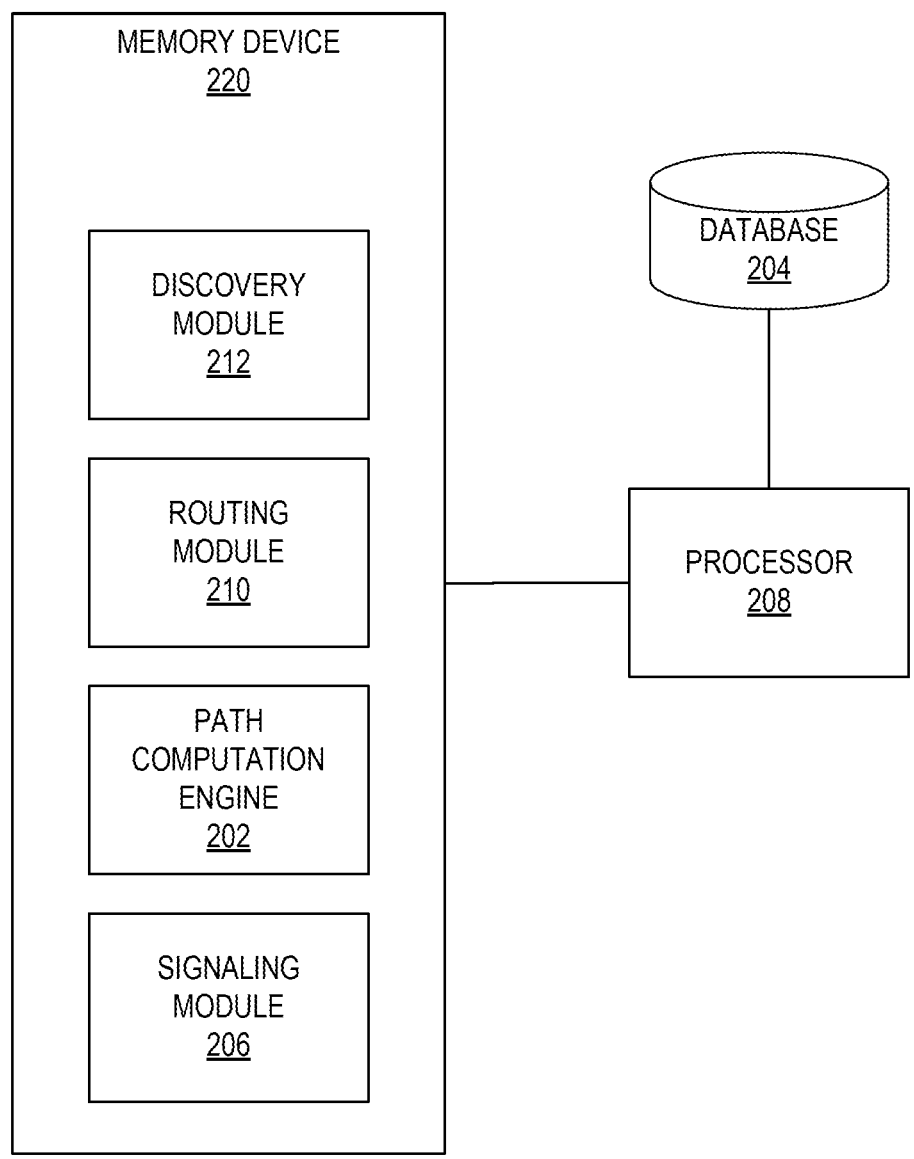
FIG. 2 is a block diagram of selected elements of an embodiment of a control system for an optical network.

Turning now to FIG. 2 a block diagram of selected elements of an embodiment of control system 200 for implementing control plane functionality in optical networks, such as, for example, in optical network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, control system 200 includes processor 208 and memory device 220, which may store executable instructions in the form of executable code that may be executable by processor 208, which has access to memory device 220. Processor 208 may execute instructions that cause control system 200 to perform the functions and operations described herein. For the purposes of this disclosure, memory device 220 may include one or more non-transitory computer-readable media that stores data and/or instructions for at least a period of time. Memory device 220 may comprise persistent and volatile media, fixed and removable media, and magnetic and semiconductor media. Memory device 220 may include, without limitation, storage media or storage devices such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory device 220 is operable to store instructions, data, or both. Memory device 220 as shown includes sets or sequences of instructions that may represent executable computer programs, namely, path computation engine 202, signaling module 206, discovery module 212, and routing module 210. As described herein, path computation engine 202, in conjunction with signaling module 206, discovery module 212, and routing module 210, may represent instructions and/or code for implementing various operations or methods according to the present disclosure.

In certain embodiments, control system 200 may be configured to interface with a user (not shown) and receive data about the optical signal transmission path. For example, control system 200 may also include and/or may be coupled to one or more input devices and/or output devices to facilitate receiving data about the optical signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device and/or a network element (not shown in FIG. 2).

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to, fiber type; fiber length; number and/or type of components; data rate; modulation format of the data; input power of the optical signal; number of signal carrying wavelengths (i.e., channels); channel spacing; traffic demand; and/or network topology, among others.

As shown in FIG. 2, routing module 210 may be responsible for propagating link connectivity information to various nodes within an optical network, such as optical network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), amplified spontaneous emission (ASE) and/or others may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as optical network 101. For example, when an ingress node in the optical network receives a service request, control system 200 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation for VON provisioning using implicit encoding of mapping constraints, as described herein, control system 200 may represent and/or include a SDON controller, while path computation engine 202 may include functionality for mapping pattern search and evaluation using implicit encoding of mapping constraints, for example. In this manner, control system 200 may apply different mapping constraints to select an optimal mapping pattern, such as routing and spectral slot assignments, according to the specific lightpaths requested in one or more VON requests. Using a search that includes a branch and bound search methodology, mapping choices, representing partial mapping patterns that potentially satisfy one or more VON requests, may be evaluated and may be rejected based on the mapping constraints before a complete mapping pattern is ever generated. The remaining mapping choices that are not rejected may result in valid mapping patterns. When at least one valid mapping pattern results from the search, the VON request may be satisfied. When multiple valid mapping patterns result from the evaluation, the SDON controller may select a final mapping pattern based on a lowest occupied number of spectral slots, which has the smallest overall spectral slot usage. In some embodiments, the final mapping pattern may be selected based on a lowest spectral slot layer, for example, when inter-channel impairments may be present or when desirable for optical network operation. It is noted that the search described herein may provide valid mapping patterns without iteration over the entire space of mapping choices. The SDON controller may then proceed to reserve the physical network resources according to the selected valid mapping pattern to service the VON request. When no valid mapping patterns are available, the VON request may not be satisfied and may be denied.

Figure 3:
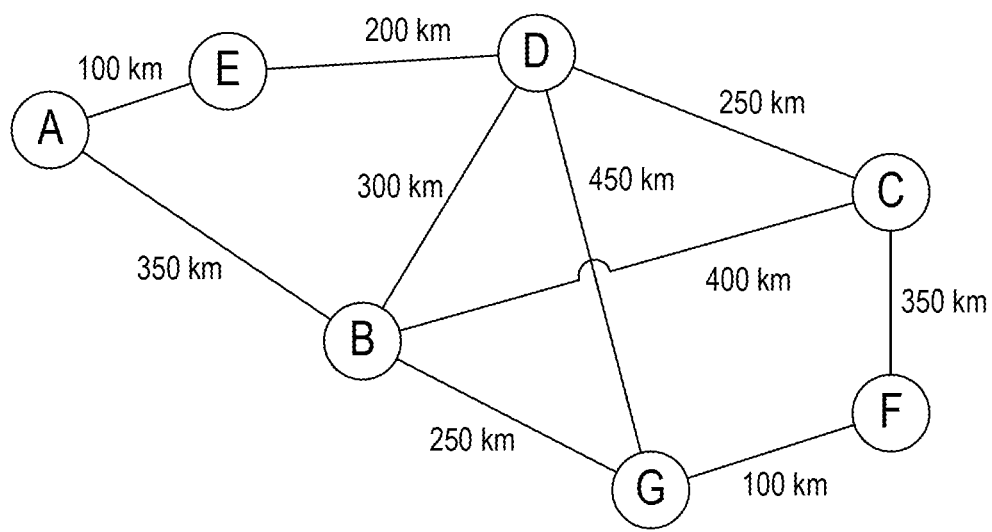
FIG. 3 is a network map of selected elements of an embodiment of a physical infrastructure.

Turning now to FIG. 3, selected elements of an embodiment of physical infrastructure 300 is shown as a network map. In FIG. 3, physical infrastructure 300 is shown including physical nodes A, B, C, D, E, F and G, while physical links (i.e., lightpaths) between the respective physical nodes are shown with link span distances in kilometers. It is noted that physical infrastructure 300 is not drawn to scale but illustrates approximate relative locations of the physical nodes from each other.

Figure 4A:
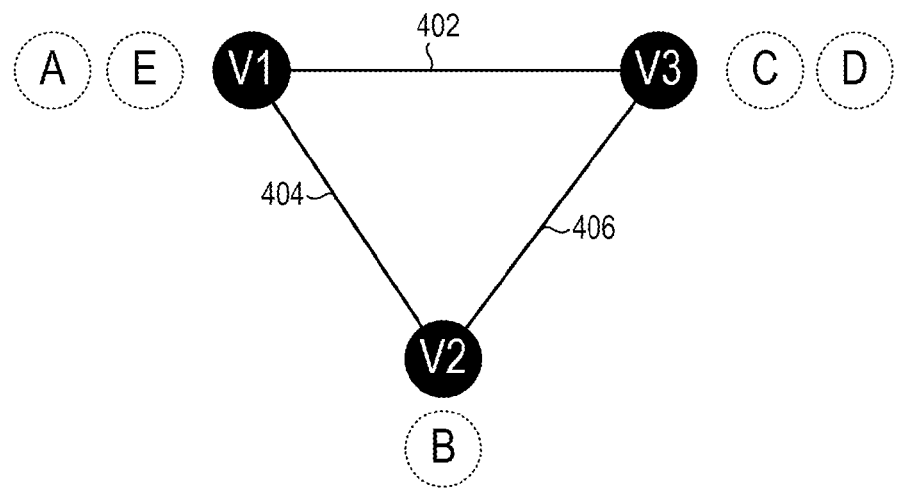
FIGS. 4A and 4B are network maps of selected elements of an embodiment of two VON requests.

Referring now to FIG. 4A, selected elements of an embodiment of VON1 request 400 are shown. In FIG. 4, VON1 request 400 specifies three virtual nodes, V1, V2, and V3, as well as three virtual links. Specifically, virtual link 402 is a link between virtual nodes V1 and V3, virtual link 404 is a link between virtual nodes V1 and V2, while virtual link 406 is a link between virtual nodes V2 and V3. As will be described in further detail herein, VON1 request 400 is an exemplary VON request that will be used to describe the methods disclosed herein with respect to physical infrastructure 300 (see FIG. 3). It may be assumed for the purposes of the present disclosure that virtual links 402, 404, and 406 have all been requested with a capacity of 400 gigabits per second (Gbps). It will be understood that, in different embodiments, different capacity specifications may be applied to each individual virtual link associated with a given VON request.

In VON1 request 400 of FIG. 4A, each one of virtual nodes V1, V2, and V3 may be mapped to at least one of physical nodes A, B, C, D, and E in physical infrastructure 300 (see FIG. 3). As shown in VON1 request 400, candidate physical nodes for each of the virtual nodes are shown with dashed lines adjacent the virtual nodes. Specifically, physical nodes A and E may be candidates for mapping to virtual node V1, physical node B may be a candidate for mapping to virtual node V2, while physical nodes C and D may be candidates for mapping to virtual node V3. The four possible mapping patterns for VON1 request 400 are listed in Table 1.

TABLE 1

Possible mapping patterns for VON1 request 400.

| Mapping Pattern (VON1 to Physical) | VON1 Node V1 | VON1 Node V2 | VON1 Node V3 |
|---|---|---|---|
| MP01 | A | B | C |
| MP02 | A | B | D |
| MP03 | E | B | C |
| MP04 | E | B | D |

Figure 4B:
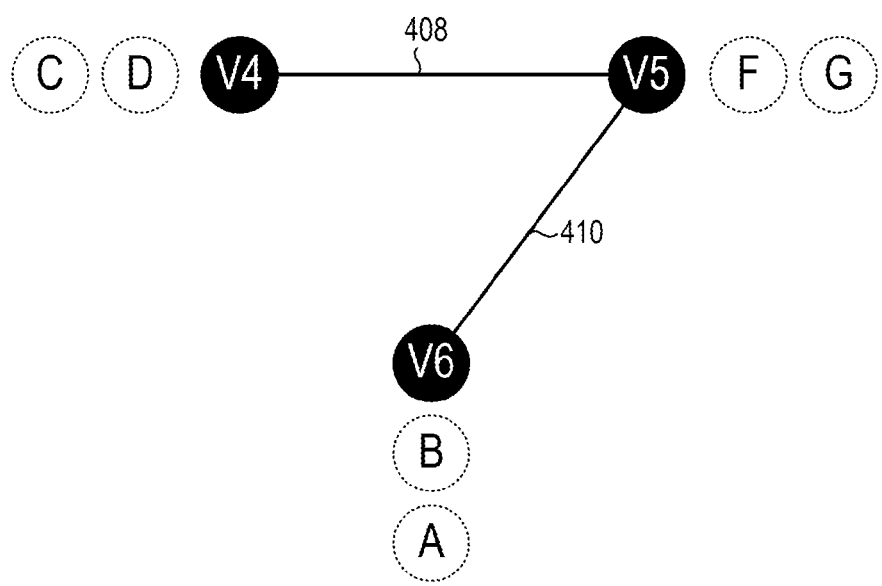

Referring now to FIG. 4B, selected elements of an embodiment of VON2 request 401 are shown. In FIG. 4B, VON2 request 401 specifies three virtual nodes, V4, V5, and V6, as well as two virtual links. Specifically, virtual link 408 is a link between virtual nodes V4 and V5, while virtual link 410 is a link between virtual nodes V5 and V6. As will be described in further detail herein, VON2 request 401 is an exemplary VON request that will be used to describe the methods disclosed herein with respect to physical infrastructure 300 (see FIG. 3). It may be assumed for the purposes of the present disclosure that virtual links 408 and 410 have all been requested with a capacity of 400 gigabits per second (Gbps). It will be understood that, in different embodiments, different capacity specifications may be applied to each individual virtual link associated with a given VON request.

In VON1 request 401 of FIG. 4B, each one of virtual nodes V4, V5, and V6 may be mapped to at least one of physical nodes A, B, C, D, F and G in physical infrastructure 300 (see FIG. 3). As shown in VON2 request 401, candidate physical nodes for each of the virtual nodes are shown with dashed lines adjacent the virtual nodes. Specifically, physical nodes C and D may be candidates for mapping to virtual node V4, physical nodes F and G may be candidates for mapping to virtual node V5, while physical nodes A and B may be candidates for mapping to virtual node V6. The eight possible mapping patterns for VON2 request 402 are listed in Table 2.

TABLE 2

Possible mapping patterns for VON2 request 401.

| Mapping Pattern (VON2 to Physical) | VON2 Node V4 | VON2 Node V5 | VON2 Node V6 |
|---|---|---|---|
| MP05 | C | F | A |
| MP06 | C | F | B |
| MP07 | C | G | A |
| MP08 | C | G | B |
| MP09 | D | F | A |
| MP10 | D | F | B |
| MP11 | D | G | A |
| MP12 | D | G | B |

Figure 5:
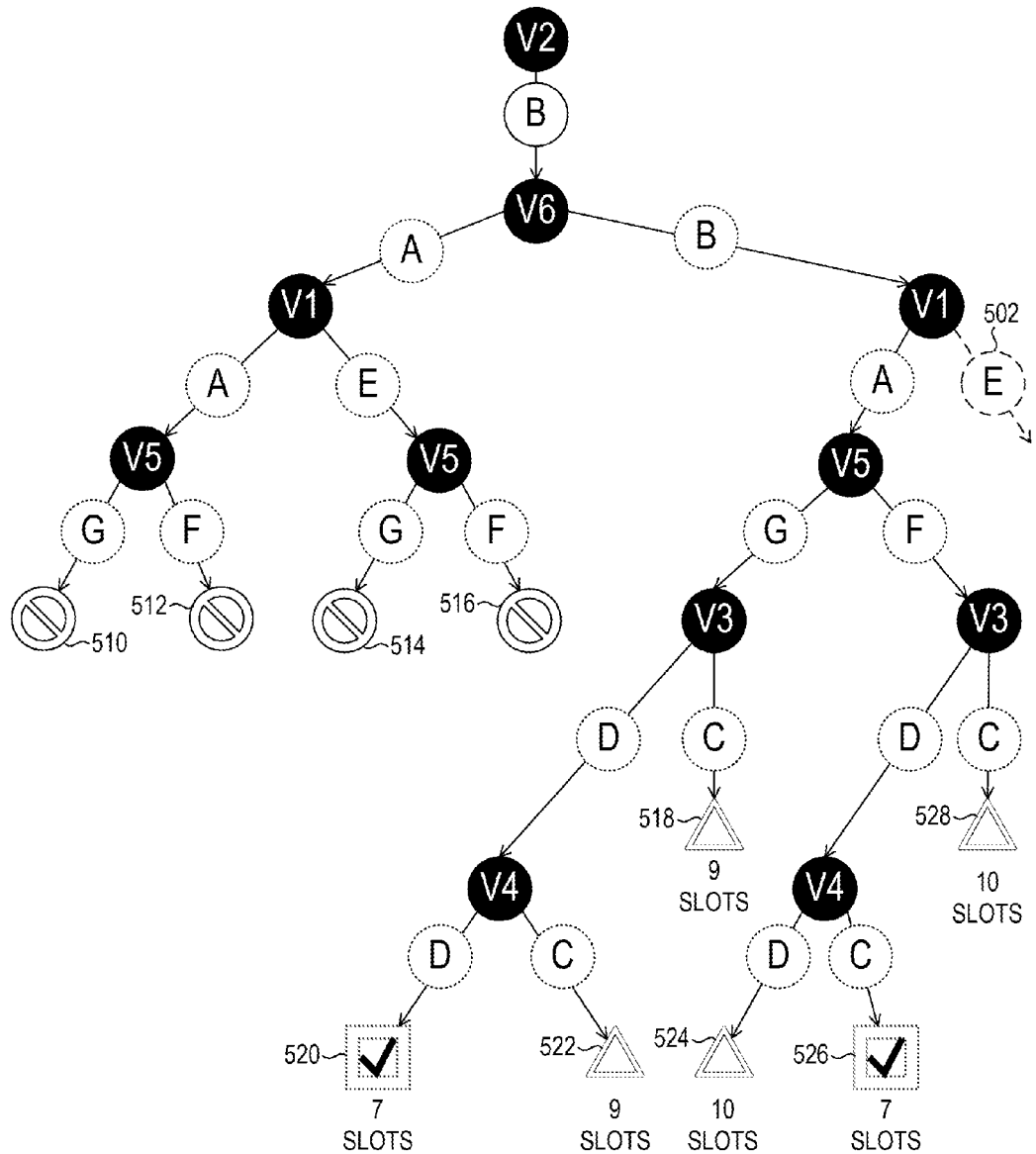
FIG. 5 is a search tree of selected elements of embodiments of mapping patterns.

Referring now to FIG. 5, selected elements of an embodiment of search tree 500 is depicted and is based on physical infrastructure 300 and concurrent receipt of VON1 request 400 and VON2 request 401 (see FIGS. 3, 4A, and 4B). As shown, search tree 500 may represent results of VON provisioning using implicit encoding of mapping constraints, as described herein. Furthermore, it may be assumed that physical infrastructure 300 supports two spectral slots for each physical network link. It is noted that an order of processing of virtual nodes may be randomly selected or selected using any other selection criteria. It is further noted that different assumptions and constraints may be applied in different embodiments.

Search tree 500 may begin with selection of virtual node V2, which has a singular candidate physical node B, and thus, is assigned as a singular mapping choice to virtual node V2, indicated by a solid line. Then, virtual node V6 may be selected and candidate physical nodes A and B may be evaluated.

After candidate physical node A for virtual node V6, virtual node V1 may be selected, having candidate physical nodes A and E. After candidate physical node A for virtual node V1 is selected, virtual node V5 may be selected having candidate physical nodes F and G. Similarly, after candidate physical node E for virtual node V1 is selected, virtual node V5 may be selected having candidate physical nodes F and G. At this point in search tree 500, it may be determined that all options for virtual node V5 are invalid mapping choices, namely mapping choices 510, 512, 514, and 516, because the capacity of physical link A-B has already been consumed along this branch in search tree 500. Therefore, it may be deduced that assignment of physical candidate node A to virtual link V6 is not a valid mapping choice. It is noted that with this evaluation, 4 of possible 32 mapping choices have been eliminated.

Selecting an alternative branch, after candidate physical node B for virtual node V6, virtual node V1 may be selected, having candidate physical nodes A and E. It is noted that branches for physical node E 502 from virtual node V1 are not included in search tree 500 (shown with a dashed line). Thus, candidate physical node A for virtual V1 is selected, leading to virtual node V5. For virtual node V5, physical candidate nodes G and F are evaluated to virtual node V3. For virtual node V3, physical candidate nodes D and C are evaluated. Then, for virtual nodes V4, physical candidate nodes D and C are also evaluated. From this branch in search tree 500, certain valid mapping choices based on the mapping choices may already be evaluated. Specifically, valid mapping choices include mapping choices corresponding to the leaf nodes 518, 520, 522, 524, 526, and 528 in the search tree 500, and may include partial mappings. Valid mapping choice 518 occupies 9 spectral slots, valid mapping choice 522 occupies 9 spectral slots, valid mapping choice 525 occupies 10 spectral slots, and valid mapping choice 528 occupies 10 spectral slots. Valid mapping choices 518, 522, 524, and 528 may be removed from consideration because they occupy more spectral slots that valid mapping choices 520 and 526, occupying 7 spectral slots each. Thus, a final mapping pattern 520 may be selected to have an overall lowest lightpath distance, corresponding to MP02 in Table 1 and MP12 in Table 2.

Figure 6A:
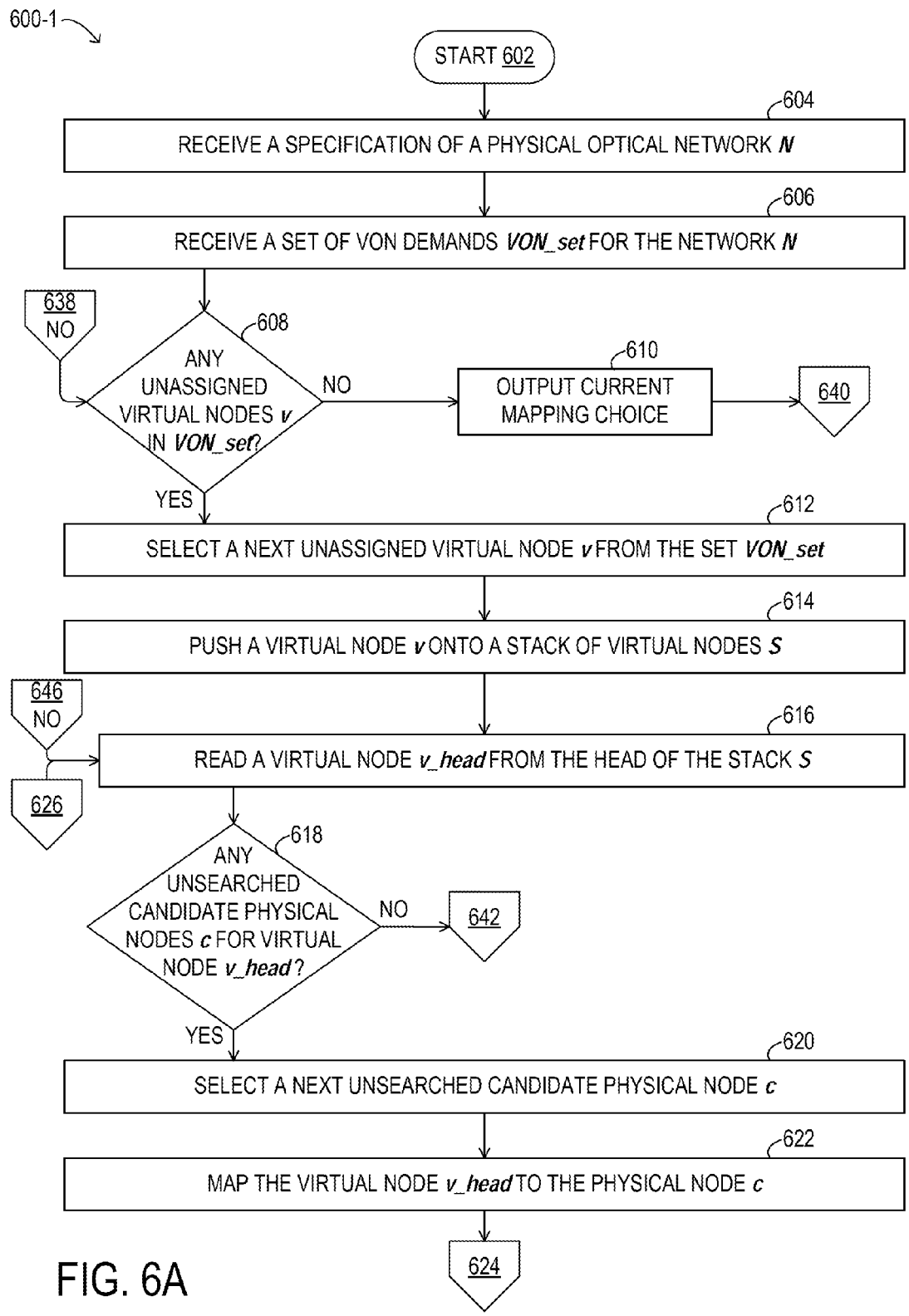
FIGS. 6A, 6B, and 6C are a flow diagram of selected elements of an embodiment of a method for VON provisioning using implicit encoding of mapping constraints.
Figure 6B:
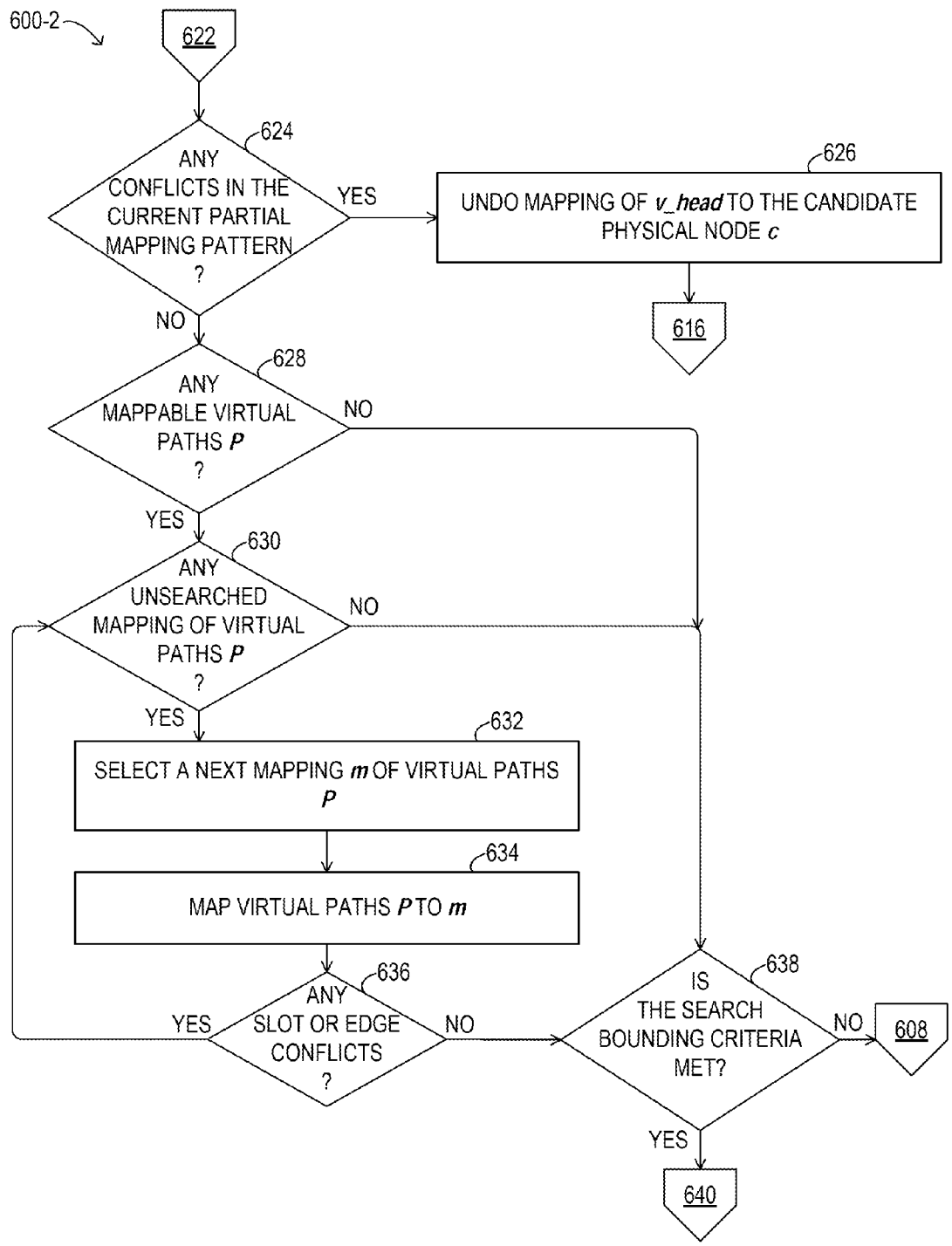
Figure 6C:
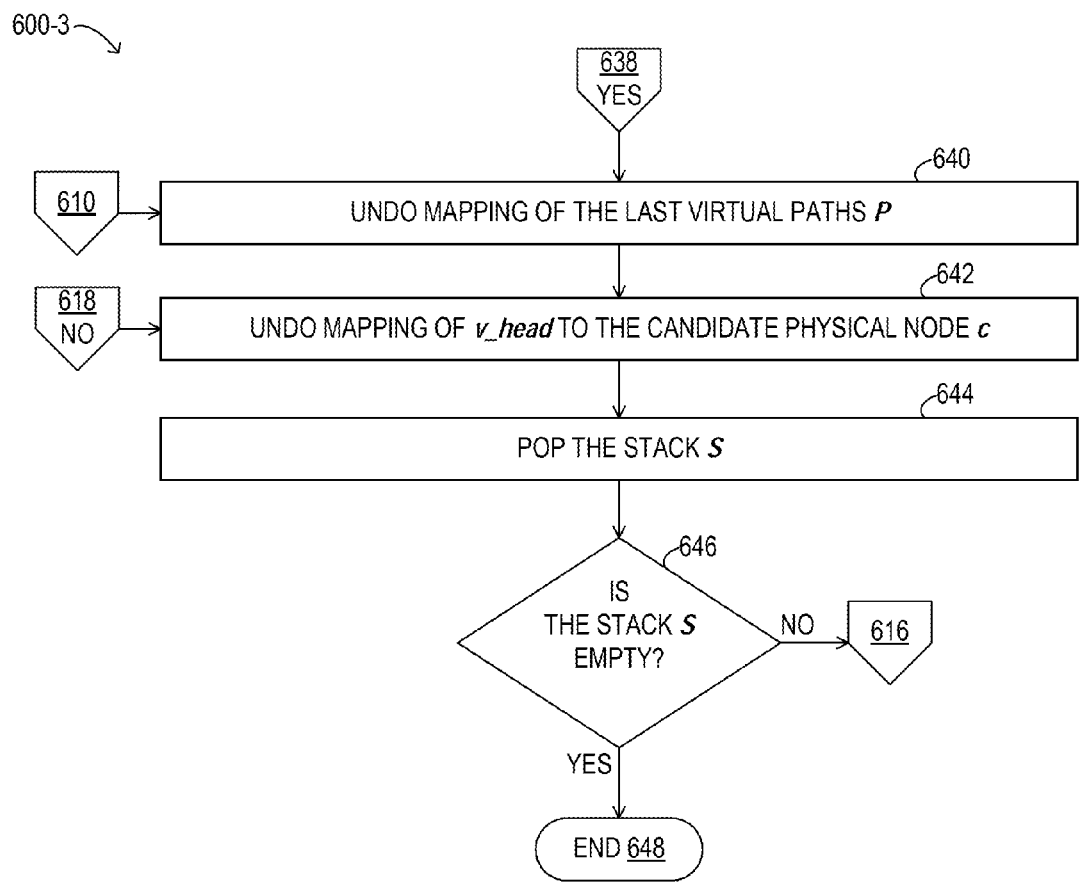

Referring now to FIGS. 6A, 6B, and 6C, a flowchart of selected elements of an embodiment of method 600 for VON provisioning using implicit encoding of mapping constraints is depicted. Method 600 may be performed using network 101 and control system 200 (see FIGS. 1 and 2). It is noted that certain operations described in method 600 may be optional or may be rearranged in different embodiments.

In FIG. 6A, method 600-1 may start at operation 602. A specification of a physical optical network N may be received at operation 604. A set of VON demands VON_set may be received for the network N at operation 606. Then, at operation 608, a decision may be made whether any unassigned virtual nodes v are in the set of VON demands VON_set. When the result of operation 608 is NO, the current mapping choice may be output at operation 610, after which method 600-1 may jump to operation 640 (see method 600-3, FIG. 6C). The current mapping choice may be accumulated among valid mapping choices. When the result of operation 608 is YES, a next unassigned virtual node v may be selected at operation 612 from the set VON_set. Then, at operation 614 a virtual node v may be pushed onto a stack of virtual nodes S. At operation 616, a virtual node v_head may be read from the head of the stack S. Then, at operation 618 a decision may be made whether any unsearched candidate physical nodes c for virtual node v_head remain. When the result of operation 618 is NO, method 600-1 may jump to operation 642 (see method 600-3, FIG. 6C). When the result of operation 618 is YES, a next unsearched candidate physical node c may be selected at operation 620. At operation 622, the virtual node v_head may be mapped to the physical node c. After operation 622, method 600-1 may advance to operation 624 in method 600-2 in FIG. 6B.

In method 600-2 in FIG. 6B, at operation 624, a decision may be made whether any conflicts in the current partial mapping pattern exist. In one embodiment, a conflict may arise at operation 624 when two virtual nodes from the same VON request have been mapped onto the same physical node. When the result of operation 624 is YES, mapping of v_head to the candidate physical node c may be undone at operation 626. After operation 626, method 600-2 may jump to operation 616 (see method 600-1, FIG. 6A). When the result of operation 624 is NO, a decision may be made at operation 628 whether any mappable virtual paths P are present. When the result of operation 628 is NO, method 600-2 may jump to operation 638. When the result of operation 628 is YES, a decision may be made at operation 630 whether any unsearched mapping of virtual paths P is present. In operation 630, method 600 may iterate over all valid mappings for each "mappable" virtual link (links where both virtual nodes have been mapped). This iteration may first find a physical path for the virtual link, such as a shortest path based on a number of node hops, and may then assign the virtual link to a slot layer, beginning with a lowest slot layer first, on the physical path. When the result of operation 630 is NO, method 600-2 may jump to operation 638. When the result of operation 630 is YES, a next mapping m of virtual paths P may be selected at operation 632. Virtual paths P may be mapped to m at operation 634. Then, at operation 636 a decision may be made whether any slot or edge conflicts are present. Operation 636 may check whether any conflicts because of edge capacity constraints being exceeded and/or slot continuity exist and may iterate over other possibilities when a violation is detected. This iteration may allow for the possibility of trying out multiple shortest paths if one does not work. When the result of operation 636 is YES, method 600-2 may jump to operation 630. When the result of operation 636 is NO, at operation 638, a decision may be made whether the search bounding criteria have been met. When the result of operation 638 is NO, method 600-2 may jump to operation 608 (see method 600-1, FIG. 6A). When the result of operation 638 is YES, method 600-2 may jump to operation 640 (see method 600-3, FIG. 6C).

In method 600-3 in FIG. 6C, at operation 640, mapping of the last virtual paths P may be undone. Mapping of v_head to the candidate physical node c may be undone at operation 642. At operation 644, the stack S may be popped. At operation 646, a decision may be made whether the stack S is empty. When the result of operation 646 is NO, method 600-3 may jump to operation 616 (see method 600-1, FIG. 6A). When the result of operation 638 is YES, method 600-3 may end at operation 648.

Figure 7:
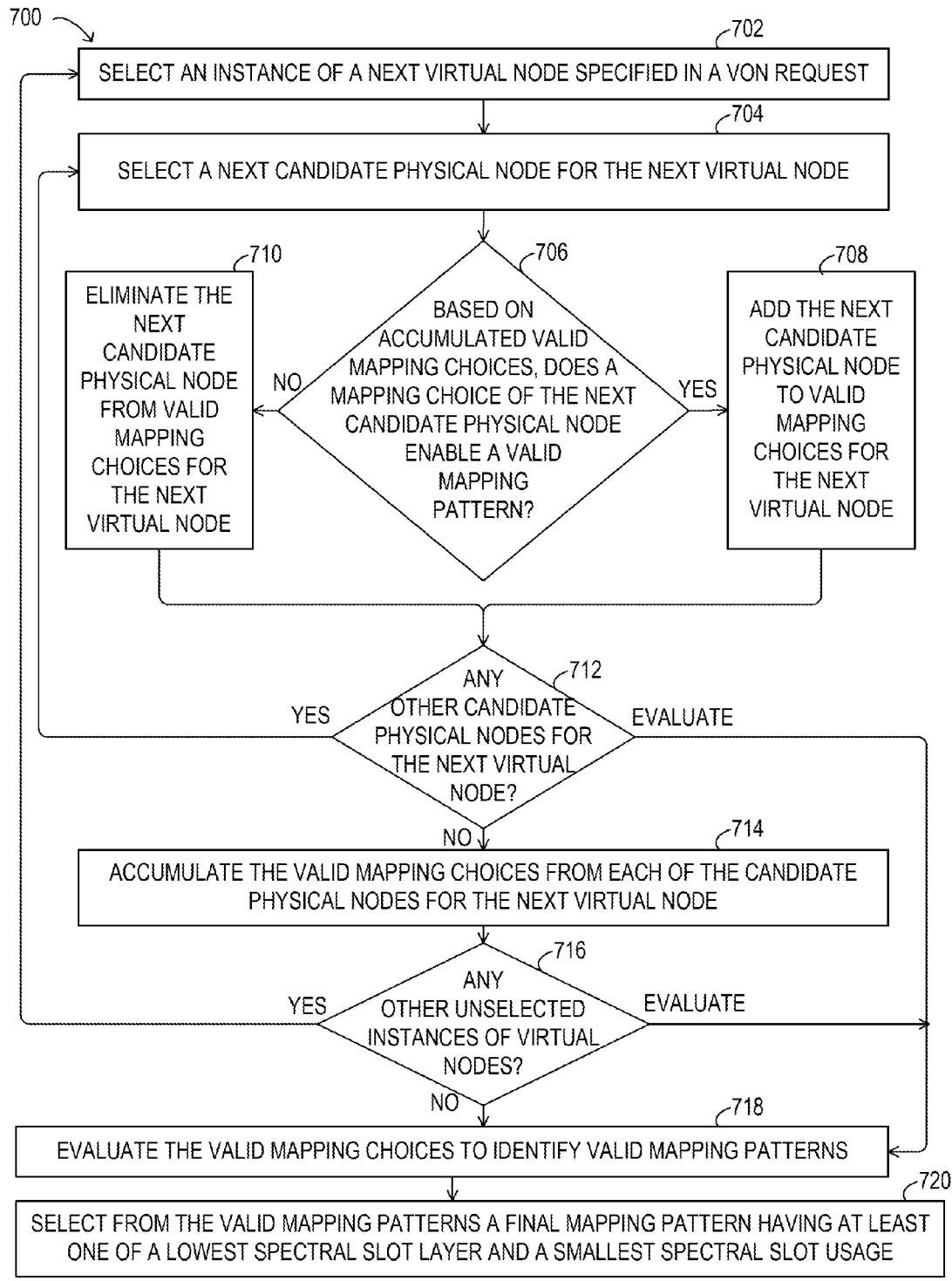
FIG. 7 is a flow diagram of selected elements of an embodiment of a method for VON provisioning using implicit encoding of mapping constraints.

Referring now to FIG. 7, a flowchart of selected elements of an embodiment of method 700 for VON provisioning using implicit encoding of mapping constraints is depicted. Method 700 may be performed using network 101 and control system 200 (see FIGS. 1 and 2). Method 700 may be directed to a search, for example, for generating search tree 500. The search may be applied responsive to receiving a VON request specifying constraints on a physical optical network. The search may be to search a space of virtual node to physical node partial mapping patterns to identify valid mapping patterns that satisfy the VON request. In some embodiments, the search may process a plurality of VON requests received together. It is noted that certain operations described in method 700 may be optional or may be rearranged in different embodiments. As used in method 700, the term 'next' refers to a current iterative selection and does not imply any ordering or sorting of the selection.

Method 700 may begin at operation 702 by selecting an instance of a next virtual node specified in a VON request. The selected instance of the next virtual node in operation 702 may be selected based on previously accumulated valid mapping choices, for example, in a manner corresponding to search tree 500 (see FIG. 5), where multiple instances of a given virtual node may be evaluated during the search. At operation 704 a next candidate physical node for the next virtual node may be selected. Then, a decision may be made at operation 706, based on accumulated valid mapping choices, whether a mapping choice of the next candidate physical node enable a valid mapping pattern. The accumulated valid mapping choices in operation 706 may have been previously accumulated during previous iterations of operation 714, as described below. When the result of operation 706 is YES, at operation 708 the next candidate physical node may be added to valid mapping choices for the next virtual node. When the result of operation 706 is NO, at operation 710, the next candidate physical node may be eliminated from valid mapping choices for the next virtual node. After operations 708 or 710, at operation 712, a decision may be made whether any other candidate physical nodes for the next virtual node are present. It is noted that candidate physical nodes may be mapped to different VON requests, when present. When the result of operation 712 is YES, method 700 may loop back to operation 704. When the result of operation 712 is NO, the valid mapping choices may be accumulated from each of the candidate physical nodes for the next virtual node, at operation 714. As shown, another result of operation 712 may be EVALUATE, resulting in an immediate evaluation of the valid mapping choices to identify valid mapping patterns at operation 718, before all other candidate physical nodes for the next virtual node have been processed. After operation 714, a decision may be made at operation 716 whether any other unselected virtual nodes remain. The unselected virtual nodes may be instances of virtual nodes specified in the VON request. When multiple VON requests are processed by method 700, any other remaining virtual nodes may be considered in operation 716. When the result of operation 716 is YES, method 700 may loop back to operation 702. When the result of operation 716 is NO, the valid mapping choices may be evaluated to identify valid mapping patterns at operation 718. As shown, another result of operation 716 may be EVALUATE, resulting in an immediate evaluation of the valid mapping choices to identify valid mapping patterns at operation 718, before all other virtual nodes have been processed. At operation 718, a final mapping pattern having at least one of a lowest spectral slot layer and a smallest spectral slot usage may be selected from the valid mapping patterns.

Additional variations may be performed with method 700. For example, the candidate physical node selection may be processed in stages, while for each stage the evaluation of the mapping patterns is performed in parallel. In certain embodiments, once a valid mapping pattern is discovered, the mapping pattern may be accepted and physical resource allocation may commence, which may be useful in real-time applications where low latency in responding to a VON request is desired. In other instances, a certain fixed number of valid mapping patterns may be generated and/or a time limit may be placed on the evaluation of mapping patterns to find an optimal tradeoff between timeliness and the best possible solution in responding to the VON request.

As disclosed herein, virtual optical network (VON) provisioning using implicit encoding of mapping constraints may include evaluating mapping choices to exclude certain mapping patterns before evaluating the mapping patterns. For each virtual node in a VON request, candidate physical nodes may be assigned and evaluated for compliance with constraints associated with the VON request. The constraints may be expanded to allow for various selection criteria for the VON request. Multiple VON requests may be simultaneously evaluated to find optimal solutions for the physical network.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for network provisioning, comprising:
responsive to receiving a first virtual optical network (VON) request specifying constraints on a physical optical network, applying a search to search a space of virtual node to physical node partial mapping patterns to identify valid mapping patterns that satisfy the first VON request, the search including:
   for each of the virtual nodes specified in the first VON request, including a first virtual node:
      based on previously accumulated valid mapping choices, evaluating candidate physical nodes for the first virtual node, including a first candidate physical node, for incorporation into the valid mapping patterns, wherein the evaluating includes:
         when a mapping choice of the first candidate physical node for the first virtual node enables a valid mapping pattern, including the first candidate physical node as a valid mapping choice for the first virtual node; and
         when a mapping choice of the first candidate physical node does not enable a valid mapping pattern, eliminating the first candidate physical node as a valid mapping choice for the first virtual node; and
      accumulating the valid mapping choices from each of the candidate physical nodes for the first virtual node;
   accumulating the valid mapping choices, respectively, for each of the virtual nodes; and
   evaluating the valid mapping choices to identify the valid mapping patterns.

2. The method of claim 1, wherein the accumulating of the valid mapping choices from each of the candidate physical nodes for the first virtual node, the accumulating of the valid mapping choices, respectively, for each of the virtual nodes, and the evaluating of the valid mapping choices to identify the valid mapping patterns are performed before all of the valid mapping choices are available for all of the virtual nodes.

3. The method of claim 2, wherein the evaluating of the valid mapping choices to identify the valid mapping patterns includes:
   identifying at least one valid mapping pattern before all of the valid mapping choices are available for all of the virtual nodes.

4. The method of claim 1, wherein the constraints specified by the VON request include at least one of:
   assignment of a physical node to at most one virtual node in a VON request;
   a virtual link capacity constraint for a virtual link between two virtual nodes;
   a distance adaptive modulation constraint for a virtual link;
   a spectral slot continuity constraint for a virtual link; and
   at least one candidate physical node constraint for a virtual node.

5. The method of claim 1, wherein applying the search includes:
   applying the search to search the space of virtual node to physical node partial mapping patterns to identify valid mapping patterns that satisfy at least two VON requests, including the first VON request.

6. The method of claim 1, further comprising:
   selecting, from the valid mapping patterns a final mapping pattern, wherein the final mapping pattern has at least one of a lowest spectral slot layer and a smallest spectral slot usage among the valid mapping patterns.

7. The method of claim 6, further comprising:
   allocating resources of the physical optical network, including physical nodes and lightpaths, based on the final mapping pattern; and
   responding to the first VON request with an indication of the final mapping pattern.

8. A system for network provisioning, comprising:
   a processor configured to access non-transitory computer readable memory media, wherein the memory media store processor-executable instructions, the instructions, when executed by a processor, cause the processor to:
      responsive to receiving a first virtual optical network (VON) request specifying constraints on a physical optical network, apply a search to search a space of virtual node to physical node partial mapping patterns to identify valid mapping patterns that satisfy the first VON request, the search including instructions to:
         for each of the virtual nodes specified in the first VON request, including a first virtual node:
            based on previously accumulated valid mapping choices, evaluate candidate physical nodes for the first virtual node, including a first candidate physical node, for incorporation into the valid mapping patterns, wherein the instructions to evaluate include:
               when a mapping choice of the first candidate physical node for the first virtual node enables a valid mapping pattern, include the first candidate physical node as a valid mapping choice for the first virtual node; and
               when a mapping choice of the first candidate physical node does not enable a valid mapping pattern, eliminate the first candidate physical node as a valid mapping choice for the first virtual node; and
         accumulate the valid mapping choices, respectively, for each of the virtual nodes; and
         evaluate the valid mapping choices to identify the valid mapping patterns.

9. The system of claim 8, wherein the instructions to accumulate the valid mapping choices from each of the candidate physical nodes for the first virtual node, the instructions to accumulate the valid mapping choices, respectively, for each of the virtual nodes, and the instructions to evaluate the valid mapping choices to identify the valid mapping patterns are executed before all of the valid mapping choices are available for all of the virtual nodes.

10. The system of claim 9, wherein the instructions to evaluate the valid mapping choices to identify the valid mapping patterns include instructions to:
   identify at least one valid mapping pattern before all of the valid mapping choices are available for all of the virtual nodes.

11. The system of claim 8, wherein the constraints specified by the VON request include at least one of:
   assignment of a physical node to at most one virtual node in a VON request;
   a virtual link capacity constraint for a virtual link between two virtual nodes;
   a distance adaptive modulation constraint for a virtual link;
   a spectral slot continuity constraint for a virtual link; and
   at least one candidate physical node constraint for a virtual node.

12. The system of claim 8, wherein the instructions to apply the search include instructions to:

apply the search to search the space of virtual node to physical node partial mapping patterns to identify valid mapping patterns that satisfy at least two VON requests, including the first VON request.

13. The system of claim 8, further comprising instructions to:
select, from the valid mapping patterns a final mapping pattern, wherein the final mapping pattern has at least one of a lowest spectral slot layer and a smallest spectral slot usage among the valid mapping patterns.

14. The system of claim 13, further comprising instructions to:
allocate physical optical network resources, including physical nodes and lightpaths, based on the final mapping pattern; and
respond to the first VON request with an indication of the final mapping pattern.

15. A non-transitory computer readable memory device storing processor-executable instructions, the instructions, when executed by a processor, cause the processor to:
responsive to receiving a first virtual optical network (VON) request specifying constraints on a physical optical network, apply a search to search a space of virtual node to physical node partial mapping patterns to identify valid mapping patterns that satisfy the first VON request, the search including instructions to:
for each of the virtual nodes specified in the first VON request, including a first virtual node:
based on previously accumulated valid mapping choices, evaluate candidate physical nodes for the first virtual node, including a first candidate physical node, for incorporation into the valid mapping patterns, wherein the instructions to evaluate include:
when a mapping choice of the first candidate physical node for the first virtual node enables a valid mapping pattern, include the first candidate physical node as a valid mapping choice for the first virtual node; and
when a mapping choice of the first candidate physical node does not enable a valid mapping pattern, eliminate the first candidate physical node as a valid mapping choice for the first virtual node; and
accumulate the valid mapping choices, respectively, for each of the virtual nodes; and
evaluate the valid mapping choices to identify the valid mapping patterns.

16. The memory device of claim 15, wherein the instructions to accumulate the valid mapping choices from each of the candidate physical nodes for the first virtual node, the instructions to accumulate the valid mapping choices, respectively, for each of the virtual nodes, and the instructions to evaluate the valid mapping choices to identify the valid mapping patterns are executed before all of the valid mapping choices are available for all of the virtual nodes.

17. The memory device of claim 16, wherein the instructions to evaluate the valid mapping choices to identify the valid mapping patterns include instructions to:
identify at least one valid mapping pattern before all of the valid mapping choices are available for all of the virtual nodes.

18. The memory device of claim 15, wherein the constraints specified by the VON request include at least one of:
assignment of a physical node to at most one virtual node in a VON request;
a virtual link capacity constraint for a virtual link between two virtual nodes;
a distance adaptive modulation constraint for a virtual link;
a spectral slot continuity constraint for a virtual link; and
at least one candidate physical node constraint for a virtual node.

19. The memory device of claim 15, wherein the instructions to apply the search include instructions to:
apply the search to search the space of virtual node to physical node partial mapping patterns to identify valid mapping patterns that satisfy at least two VON requests, including the first VON request.

20. The memory device of claim 15, further comprising instructions to:
select, from the valid mapping patterns a final mapping pattern, wherein the final mapping pattern has at least one of a lowest spectral slot layer and a smallest spectral slot usage among the valid mapping patterns.

21. The memory device of claim 20, further comprising instructions to:
allocate physical optical network resources, including physical nodes and lightpaths, based on the final mapping pattern; and
respond to the first VON request with an indication of the final mapping pattern.

* * * * *